United States Patent
Urimoto et al.

(10) Patent No.: US 10,906,577 B2
(45) Date of Patent: Feb. 2, 2021

(54) ELECTRIC POWER STEERING APPARATUS

(71) Applicant: Mitsubishi Electric Corporation, Tokyo (JP)

(72) Inventors: Kentaro Urimoto, Tokyo (JP); Yoshihito Asao, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 197 days.

(21) Appl. No.: 15/780,474

(22) PCT Filed: Apr. 6, 2016

(86) PCT No.: PCT/JP2016/061211
§ 371 (c)(1),
(2) Date: May 31, 2018

(87) PCT Pub. No.: WO2017/175325
PCT Pub. Date: Oct. 12, 2017

(65) Prior Publication Data
US 2019/0016371 A1    Jan. 17, 2019

(51) Int. Cl.
  *H02K 11/33*    (2016.01)
  *B62D 5/04*    (2006.01)
  (Continued)

(52) U.S. Cl.
  CPC ............. *B62D 5/0406* (2013.01); *H02K 3/50* (2013.01); *H02K 5/04* (2013.01); *H02K 5/225* (2013.01); *H02K 11/33* (2016.01); *B62D 5/0463* (2013.01); *H02K 11/21* (2016.01); *H02K 11/24* (2016.01); *H02P 25/22* (2013.01); *H02P 27/06* (2013.01)

(58) Field of Classification Search
  CPC .... H02K 11/33; H02K 5/225; H02K 11/0094; H02K 11/30; B62D 5/0406
  See application file for complete search history.

(56) References Cited

U.S. PATENT DOCUMENTS 6,879,071 B2 *  4/2005  Kanazawa ............ H02K 1/185
                                                  310/71
2013/0249335 A1    9/2013  Motoda
(Continued)

FOREIGN PATENT DOCUMENTS

JP    2015-154673 A    8/2015
JP    2016-36244 A    3/2016
(Continued)

OTHER PUBLICATIONS

Communication dated Mar. 12, 2019 issued by the Japanese Patent Office in counterpart application No. 2018-510166.
(Continued)

*Primary Examiner* — Dang D Le
(74) *Attorney, Agent, or Firm* — Sughrue Mion, PLLC; Richard C. Turner

(57) ABSTRACT

A power-source connector is situated at or in the vicinity of the radial-direction middle portion of a housing and is fixed to the housing, and a first connection portion and a second connection portion for connecting the winding terminal of an armature winding with a control circuit unit are substantially symmetrically arranged at positions corresponding to the radial-direction peripheral portions of the power-source connector.

16 Claims, 5 Drawing Sheets

(51) Int. Cl.
  *H02K 5/22* (2006.01)
  *H02K 5/04* (2006.01)
  *H02K 3/50* (2006.01)
  *H02K 11/21* (2016.01)
  *H02K 11/24* (2016.01)
  *H02P 27/06* (2006.01)
  *H02P 25/22* (2006.01)

(56) References Cited

U.S. PATENT DOCUMENTS

| 2013/0257232 | A1 | 10/2013 | Tomizawa et al. | |
|---|---|---|---|---|
| 2014/0326530 | A1* | 11/2014 | Asao | B62D 5/0403 180/443 |
| 2015/0236570 | A1* | 8/2015 | Hayashi | H02K 11/33 310/45 |
| 2016/0036289 | A1 | 2/2016 | Kawata et al. | |
| 2016/0036304 | A1 | 2/2016 | Yamasaki et al. | |
| 2016/0347354 | A1 | 12/2016 | Asao et al. | |
| 2018/0048217 | A1 | 2/2018 | Hayashi | |

FOREIGN PATENT DOCUMENTS

| JP | 2016-36246 A | 3/2016 |
|---|---|---|
| WO | 2015/145630 A1 | 10/2015 |

OTHER PUBLICATIONS

Extended European Search Report dated Feb. 14, 2019 issued by the European Patent Office in counterpart application No. 16897884.9.
Communication dated Mar. 9, 2020, from the European Patent Office in application No. 16897884.9.
International Search Report for PCT/JP2016/061211, dated Jun. 14, 2016 (PCT/ISA/210).
Communication dated Jun. 1, 2020, from the State Intellectual Property Office of the P.R.C in application No. 201680084252.4.

\* cited by examiner

ELECTRIC POWER STEERING APPARATUS

CROSS REFERENCE TO RELATED APPLICATIONS

This application is a National Stage of International Application No. PCT/JP2016/061211 filed Apr. 6, 2016.

TECHNICAL FIELD

The present invention relates to a vehicle electric power steering apparatus, particularly to an electric power steering apparatus in which a motor and a control unit are integrated.

BACKGROUND ART

As is well known, an electric power steering apparatus is configured in such a way that an electric motor produces auxiliary torque corresponding to steering torque that is exerted by a driver on the steering system of a vehicle and then the auxiliary torque is exerted on the steering system so as to assist the driver's steering. To date, there has practically been utilized an electric power steering apparatus in which a single electric motor has two groups of armature windings, configured in the same manner, and a control unit is provided with two groups of inverter circuits that can independently drive the two groups of armature windings. Such an electric power steering apparatus is configured in such a way that control is performed by making the two groups of inverter circuits collaborate with each other and in such a way that when an abnormality exists in a control system including one of the inverter circuits, only a control system including the other one of the inverter circuits, which is normal, continues driving of the electric motor so that steering of the vehicle is prevented from becoming impossible and hence the safety of the vehicle is secured.

To date, in such an electric power steering apparatus as described above, there have been disclosed configurations in each of which an electric motor and a control unit are coaxially arranged on the axis line of the output axle of the electric motor and the control unit is disposed at the anti-output side of the electric motor so that the electric motor and the control unit are integrated (e.g., refer to Patent Document 1). In a conventional electric power steering apparatus disclosed in Patent Document 1, the six winding end portions of two groups of armature windings of an electric motor are collectively extended from the electric motor to the control unit and then are connected with the inverter unit in the control unit. The connection portions between the winding end portions and the inverter unit are extended into the control unit or to the outside of a cover. Furthermore, a power-source-system connector unit is disposed in the vicinity of the middle portion of the cover that covers the control unit; a capacitor, a choke coil, the winding end portions of stator windings, and the like to be connected with the power-source-system connector are arranged in the inner space of the control unit cover.

PRIOR ART REFERENCE

Patent Document

[Patent Document 1] Japanese Patent Application Laid-Open No. 2015-154673

DISCLOSURE OF THE INVENTION

Problems to be Solved by the Invention

Because the conventional electric power steering apparatus disclosed in Patent Document 1 is configured in such a manner as described above, the winding end portions of the armature windings and large components such as the capacitor and the choke coil occupy a large area in the inner space of the control unit cover and hence downsizing of the electric power steering apparatus is hindered.

The present invention has been implemented in order to solve the foregoing problem in a conventional electric power steering apparatus; the objective thereof is to provide an electric power steering apparatus that can be downsized by optimizing the arrangement of the components.

Means for Solving the Problems

An electric power steering apparatus according to the present invention includes
an electric motor that has two groups of armature windings having the same configuration and generates assist torque corresponding to steering torque produced by a vehicle driver,
a controller that has two groups of control circuits capable of separately controlling the two groups of armature windings and that is disposed on the axle- direction end portion, at the anti-output side, of the electric motor so as to be integrally fixed to the electric motor, and
a housing that is fixed to the electric motor and covers the controller; the electric power steering apparatus is characterized
in that the controller includes
a power-source connector that connects the controller with an external power source,
a first connection portion where the winding terminal of the armature winding of one of the two groups of armature windings is connected with one of the two groups of control circuits,
a second connection portion where the winding terminal of the armature winding of the other one of the two groups of armature windings is connected with the other one of the two groups of control circuits,
in that the power-source connector is situated at or in the vicinity of the radial-direction middle portion of a housing and is fixed to the housing, and
in that the first connection portion and the second connection portion are substantially symmetrically arranged at positions corresponding to the radial-direction peripheral portions of the power-source connector."

Advantage of the Invention

In an electric power steering apparatus according to the present invention, the controller includes a power-source connector that connects the controller with an external power source, a first connection portion where the winding terminal of the armature winding of one of the two groups of armature windings is connected with one of the two groups of control circuits, and a second connection portion where the winding terminal of the armature winding of the other one of the two groups of armature windings is connected with the other one of the two groups of control circuits; a power-source connector is situated at or in the vicinity of the radial-direction middle portion of a housing and is fixed to the housing; the first connection portion and the second connection portion are substantially symmetrically arranged at positions corresponding to the radial-direction peripheral portions of the power-source connector; thus, all portions of the controller can be arranged within the diameter of the motor and hence downsizing can be achieved."

BEST MODE FOR CARRYING OUT THE INVENTION

Embodiment 1

Figure 1:
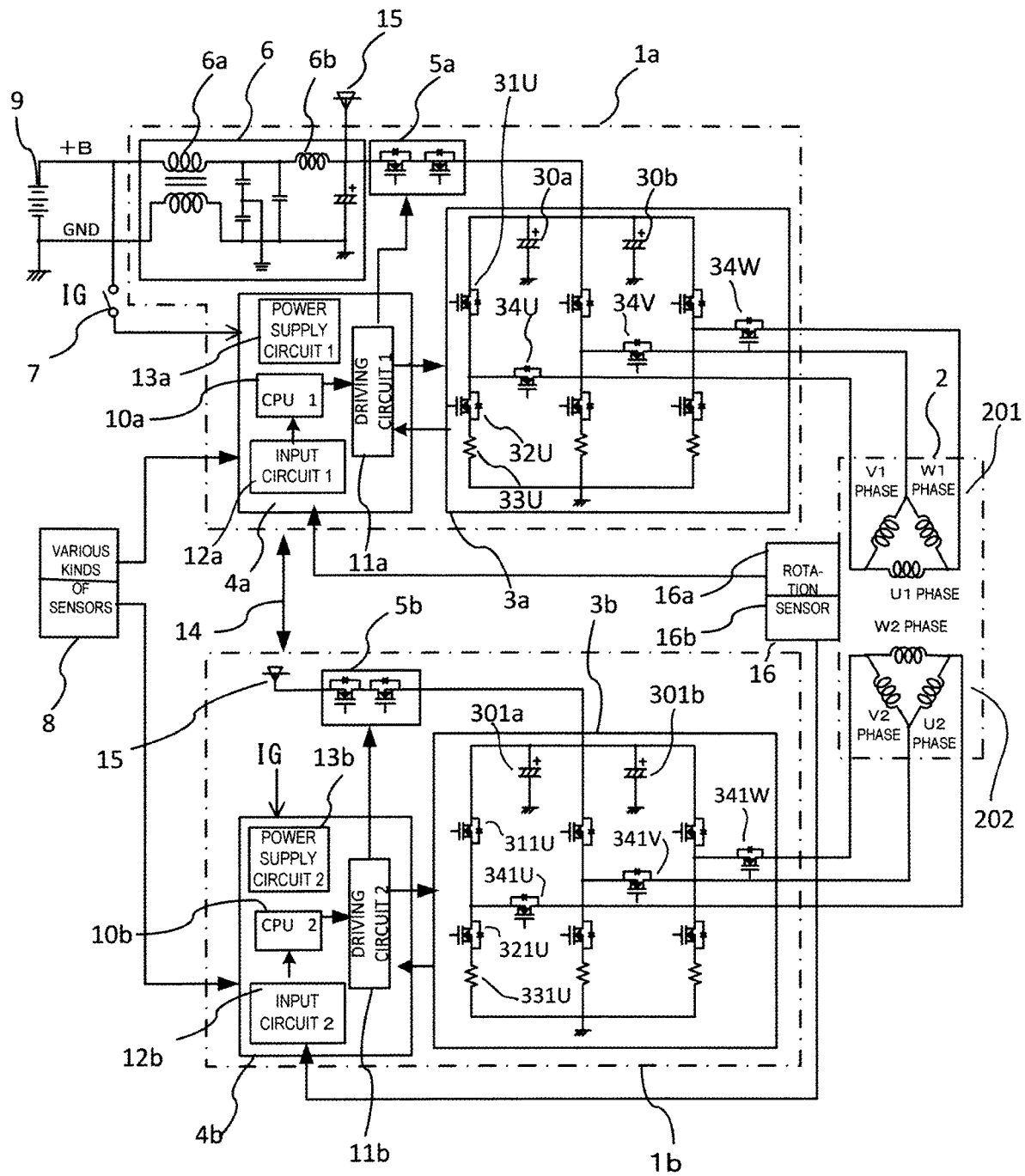
FIG. 1 is a circuit configuration diagram of an electric power steering apparatus according to any one of Embodiments 1 and 2 of the present invention.

Hereinafter, Embodiment 1 of the present invention will be explained based on the drawings. FIG. 1 is a circuit configuration diagram of an integrated electric power steering apparatus according to Embodiment 1 of the present invention; FIG. 1 represents a circuit configuration mainly including an electric motor and a control unit, as a controller. In FIG. 1, in Embodiment 1, the electric motor 2 is formed of a brushless motor provided with a stator having a first armature winding 201 and a second armature winding 202, which are independent from each other, and a rotor having magnetic-field poles formed of permanent magnets. The first armature winding 201 is formed of a three-phase winding in which a first U-phase winding U1, a first V-phase winding V1, and a first W-phase winding W1 are Δ-connected. The second armature winding 202 is formed of a three-phase winding in which a second U-phase winding U2, a second V-phase winding V2, and a second W-phase winding W2 are Δ-connected."

The electric motor 2 may be a motor with a brush; moreover, each of the first armature winding 201 and the second armature winding 202 may be a multiphase winding of three phases or more. Furthermore, the electric motor 2 may be not a three-phase Δ-connection brushless motor but a three-phase Y-connection brushless motor or double-pole two-pair brush motor. With regard to the winding specification, distributed winding and concentrated winding can be adopted, as is the case with a conventional apparatus. Furthermore, the electric motor 2 may be a so-called tandem motor having two stators.

In Embodiment 1, as described above, the electric motor 2 is a brushless motor in which three-phase two groups of the armature windings 201 and 202 are Δ-connected; thus, a rotation sensor unit 16 for detecting the rotation position of the rotor of the electric motor 2 is formed as a dual system so as to secure the redundancy and is provided with a first rotation sensor 16a, a second rotation sensor 16b, and a rotation sensor rotor 16c (refer to FIG. 2) that is shared by the first rotation sensor 16a and the second rotation sensor 16b. As described later, the rotation sensor rotor 16c is fixed at the anti-output side of the output axle of the motor 2. The first rotation sensor 16a and the second rotation sensor 16b are arranged in such a way as to face the rotation sensor rotor 16c and to be spaced a predetermined gap apart from the rotation sensor rotor 16c in the axle direction. A battery 9 mounted in a vehicle, an ignition switch 7, and various kinds of sensors 8 such as a vehicle speed sensor and a torque sensor that detects steering torque on a handwheel are provided outside the electric power steering apparatus.

A first control unit 1a, as a first controller, is formed mainly of a first inverter circuit 3a that supplies electric power to the first armature winding 201 of the electric motor 2, a first control circuit unit 4a, as a first control circuit, equipped with a first CPU 10a, a first power-source relay 5a, and a filter unit 6, as a filter. The +B terminal and the GND terminal to be connected with the battery 9 and the filter unit 6 are utilized also in a second control unit 1b, as a second controller, described later."

The first inverter circuit 3a is formed of a three-phase bridge circuit having a U-phase arm including a U-phase upper arm and a U-phase lower arm, a V-phase arm including a V-phase upper arm and a V-phase lower arm, and a W-phase arm including a W-phase upper arm and a W-phase lower arm. The U-phase upper arm has a U-phase upper arm switching device 31U, and the U-phase lower arm has a U-phase low arm switching device 32U. Similarly, the V-phase upper arm has a V-phase upper arm switching device; the V-phase lower arm has a V-phase lower arm switching device; the W-phase upper arm has a W-phase upper arm switching device; the W-phase lower arm has a W-phase lower arm switching device. For the sake of avoiding the complexity of the drawing, the reference characters of the switching devices other than the U-phase-arm switching devices are omitted. Each of these switching devices is formed of, for example, a MOSFET having a parasitic diode.

The first inverter circuit 3a further has a noise-suppression first capacitor 30a that is connected between the GND terminal and the connection portion between the U-phase upper arm and the V-phase upper arm and a noise-suppression second capacitor 30b that is connected between the GND terminal and the connection portion between the V-phase upper arm and the W-phase upper arm. A first U-phase shunt resistor 33U, a first V-phase shunt resistor, and a first W-phase shunt resistor for detecting respective currents flowing in the first windings U1, V1, and W1 of the respective phases are connected with the U-phase lower arm switching device 32U, the V-phase lower arm switching device, and the W-phase lower arm switching device, respectively. For the sake of avoiding the complexity of the drawing, the reference characters of the shunt resistors other than the U-phase-arm shunt resistor 33U are omitted."

A U-phase output terminal pulled out from the connection point between the U-phase upper arm and the U-phase lower arm of the first inverter circuit 3a is connected with the winding terminal of the first U-phase winding U1 by way of a U-phase first motor switching device 34U. Similarly, a V-phase output terminal pulled out from the connection point between the V-phase upper arm and the V-phase lower arm is connected with the winding terminal of the first V-phase winding V1 by way of a V-phase first motor switching device 34V. Moreover, a W-phase output terminal pulled out from the connection point between the W-phase upper arm and the W-phase lower arm is connected with the winding terminal of the first W-phase winding W1 by way of a W-phase first motor switching device 34W. Each of the first motor switching devices 34U, 34V, and 34W of the respective phases is formed of, for example, a FET having a parasitic diode and has a function as a motor relay that opens or closes the path between the first armature winding 201 and the first inverter circuit 3a.

The power source +B terminal and the GND terminal are connected with the battery 9 mounted in the vehicle; by means of an ignition switch 7, a power source is applied by way of a first power-supply circuit 13a of the first control circuit unit 4a. Moreover, information pieces, for example, from a torque sensor that is mounted in the vicinity of a handwheel (unillustrated) and detects steering torque produced by a driver, a speed sensor that detects the traveling speed of the vehicle, and the like are inputted from sensors 8. As described above, the filter unit 6 is shared by the first control unit 1a and the second control unit 1b. The power source 15 after the filter unit 6 is connected with the first control unit 1a and the second control unit 1b. The filter unit 6 is provided with a common mode coil 6a, a normal mode coil 6b, capacitors, and the like; however, it is made possible that depending on the magnitude of noise in the apparatus, only one of the foregoing coils is utilized and the number of the capacitors is adjusted."

It may be allowed that the filter unit 6 is provided in each of the first control unit 1a and the second control unit 1b.

The second control unit 1b is formed mainly of a second inverter circuit 3b that supplies electric power to the second armature winding 202 of the electric motor 2, a second control circuit unit 4b, as a second control circuit, equipped with a second CPU 10b, and a second power-source relay 5b. The +B terminal and the GND terminal to be connected with the battery 9 and the filter unit 6 provided in the foregoing first control unit 1a are utilized also in the second control unit 1b.

The second inverter circuit 3b is formed of a three-phase bridge circuit having a U-phase arm including a U-phase upper arm and a U-phase lower arm, a V-phase arm including a V-phase upper arm and a V-phase lower arm, and a W-phase arm including a W-phase upper arm and a W-phase lower arm. The U-phase upper arm has a U-phase upper arm switching device 311U, and the U-phase lower arm has a U-phase lower arm switching device 321U. Similarly, the V-phase upper arm has a V-phase upper arm switching device; the V-phase lower arm has a V-phase lower arm switching device; the W-phase upper arm has a W-phase upper arm switching device; the W-phase lower arm has a W-phase lower arm switching device. For the sake of avoiding the complexity of the drawing, the reference characters of the switching devices other than the U-phase-arm switching devices are omitted. Each of these switching devices is formed of, for example, a MOSFET having a parasitic diode.

The second inverter circuit 3b further has a noise-suppression third capacitor 301a that is connected between the GND terminal and the connection portion between the U-phase upper arm and the V-phase upper arm and a noise-suppression fourth capacitor 301b that is connected between the GND and the connection portion between the V-phase upper arm and the W-phase upper arm. A second U-phase shunt resistor 331U, a second V-phase shunt resistor, and a second W-phase shunt resistor for detecting respective currents flowing in the second windings U2, V2, and W2 of the respective phases are connected with the U-phase lower arm switching device 32U, the V-phase lower arm switching device, and the W-phase lower arm switching device, respectively. For the sake of avoiding the complexity of the drawing, the reference characters of the shunt resistors other than the U-phase-arm shunt resistor 331U are omitted."

A U-phase output terminal pulled out from the connection point between the U-phase upper arm and the U-phase lower arm of the second inverter circuit 3b is connected with the winding terminal of the second U-phase winding U2 by way of a U-phase second motor switching device 341U. Similarly, a V-phase output terminal pulled out from the connection point between the V-phase upper arm and the V-phase lower arm is connected with the winding terminal of the second V-phase winding V2 by way of a V-phase second motor switching device 341V. Moreover, a W-phase output terminal pulled out from the connection point between the W-phase upper arm and the W-phase lower arm is connected with the winding terminal of the second W-phase winding W2 by way of a W-phase second motor switching device 341W. Each of the second motor switching devices 341U, 341V, and 341W of the respective phases is formed of, for example, a FET having a parasitic diode and has a function as a motor relay that opens or closes the path between the second armature winding 202 and the second inverter circuit 3b.

The power source +B terminal and the GND terminal are connected with the battery 9 mounted in the vehicle; by means of the ignition switch 7, a power source is applied by way of a second power-supply circuit 13b of the second control circuit unit 4b. Moreover, information pieces, for example, from the torque sensor that is mounted in the vicinity of the handwheel (unillustrated) and detects steering torque produced by the driver, the speed sensor that detects the traveling speed of the vehicle, and the like are inputted from sensors 8."

In the integrated electric power steering apparatus, according to Embodiment 1 of the present invention, that is configured in such a manner as described above, when the driver turns on the ignition switch 7, the first power-supply circuit 13a is supplied with electric power by the battery 9 so as to generate a predetermined DC constant voltage and to supply the DC constant voltage to the first CPU 10a, a first input circuit 12a, and a first driving circuit 11a in the first control unit 1a. The second power-supply circuit 13b is supplied with electric power by the battery 9 so as to generate a predetermined DC constant voltage and to supply the DC constant voltage to the second CPU 10b, a second input circuit 12b, and a second driving circuit 11b in the second control unit 1b. Furthermore, the battery 9 supplies a DC voltage to the first inverter circuit 3a and the second inverter circuit 3b, by way of the filter unit 6.

Information pieces from the various kinds of sensors 8 such as the vehicle speed sensor and the torque sensor are inputted to the first CPU 10a by way of the first input circuit 12a; concurrently, the information pieces are inputted to the second CPU 10b by way of the second input circuit 12b. Based on these inputted information pieces, each of the first CPU 10a and the second CPU 10b calculates a control amount for supplying electric power to the electric motor 2; a first control command based on the result of the calculation by the first CPU 10a is provided to the first driving circuit 11a; a second control command based on the result of the calculation by the second CPU 10b is provided to the second driving circuit 11b.

Based on the first control command from the first CPU 10a, the first driving circuit 11a performs PWM driving of the upper arm switching devices and the lower arm switching devices of the respective phases, such as the U-phase upper arm switching device 31U and the U-phase lower arm switching device 32U, in the first inverter circuit 3a. Similarly, based on the second control command from the second CPU 10b, the second driving circuit 11b performs PWM driving of the upper arm switching devices and the lower arm switching devices of the respective phases, such as the U-phase upper arm switching device 311U and the U-phase lower arm switching device 321U, in the second inverter circuit 3b.

The first inverter circuit 3a supplies electric power to the first armature winding 201 of the electric motor 2, by way of the U-phase switching device 34U, the V-phase switching device 34V, and the W-phase switching device 34W; the second inverter circuit 3b supplies electric power to the second armature winding 202 of the electric motor 2, by way of the U-phase switching device 341U, the V-phase switching device 341V, and the W-phase switching device 341W. When undergoing a rotating magnetic field generated by the first armature winding 201 and the second armature winding 202, the rotor of the electric motor 2 produces predetermined rotation torque; the produced rotation torque, as auxiliary torque, is exerted on the steering shaft so as to assist the driver's steering."

The voltage values or current values at respective portions of the first inverter circuit 3a and the second inverter circuit 3b and the information pieces on the rotation angle of the rotor of the electric motor 2 from the first rotation sensor 16a and the second rotation sensor 16b are transferred to the first CPU 10a and the second CPU 10b by way of the first input circuit 12a and the second input circuit 12b, respectively. Based on these transferred information pieces, the first CPU 10a performs feedback control of the first inverter circuit 3a and the second CPU 10b performs feedback control of the second inverter circuit 3b.

In the case where a failure occurs in the first inverter circuit 3a or in the case where a failure occurs in the first armature winding 201, commands from the first CPU 10a forcibly turn off the first power-source-relay switching device 5a and/or the motor switching devices 34U, 34V, and 34W, so that the first inverter circuit 3a and/or the first armature winding 201 can be disconnected from the battery 9.

Similarly, in the case where a failure occurs in the second inverter circuit 3b or in the case where a failure occurs in the second armature winding 202, commands from the second CPU 10b forcibly turn off the second power-source-relay switching device 5b and/or the motor switching devices 341U, 341V, and 341W, so that the second inverter circuit 3b and/or the second armature winding 202 can be disconnected from the battery 9.

Furthermore, even when the battery 9 is connected in such a way that the polarity thereof is reversed, the parasitic diodes in the first power-source-relay switching device 5a and the second power-source-relay switching device 5b cut off the lines in which the respective currents of the first inverter circuit 3a and the second inverter circuit 3b flow, so that the first inverter circuit 3a and the second inverter circuit 3b can be protected.

The switching devices of the respective phases, such as the U-phase upper arm switching device 31U and the U-phase lower arm switching device 32U, in the first inverter circuit 3a are PWM-driven based on the commands from the first CPU 10a; noise signals generated through the PWM driving are suppressed by the first capacitor 30a and the second capacitor 30b. Similarly, the switching devices of the respective phases, such as the U-phase upper arm switching device 311U and the U-phase lower arm switching device 321U, in the second inverter circuit 3b are PWM-driven based on the commands from the second CPU 10b; noise signals generated through the PWM driving are suppressed by the third capacitor 301a and the fourth capacitor 301b.

The voltages and/or currents at the respective connection points between the upper arm switching devices and the lower arm switching devices of the respective phases, such as the connection point between the U-phase upper arm switching device 31U and the U-phase lower arm switching device 32U and the like, the voltages and/or currents at the shunt resistors of the respective phases, such as the U-phase shunt resistor 33U and the like, and the respective inter-winding-terminal voltages and/or currents of the first U-phase winding U1, the first V-phase winding V1, and the first W-phase winding W1 of the first armature winding 201 in the first inverter circuit 3a are transferred to the first CPU 10a; the difference between a control command value (target value) and the actual current or voltage value is comprehended, and then so-called feedback control and a fault determination are performed. The information, on the rotation angle of the rotor of the electric motor 2, that is detected by the first rotation sensor 16a is transferred to the first CPU 10a; the rotation position and/or the rotation speed of the electric motor are/is calculated and then are/is utilized in the feedback control of the first inverter circuit 3a and the like.

The voltages and/or currents at the respective connection points between the upper arm switching devices and the lower arm switching devices of the respective phases, such as the connection point between the U-phase upper arm switching device 311U and the U-phase lower arm switching device 321U and the like, the voltages and/or currents at the shunt resistors of the respective phases, such as the U-phase shunt resistor 331U and the like, and the respective inter-winding-terminal voltages and/or currents of the second U-phase winding U2, the second V-phase winding V2, and the second W-phase winding W2 of the second armature winding 202 in the second inverter circuit 3b are transferred to the second CPU 10b; the difference between a control command value (target value) and the actual current or voltage value is comprehended, and then so-called feedback control and a fault determination are performed. The information, on the rotation angle of the rotor of the electric motor 2, that is detected by the second rotation sensor 16b is transferred to the second CPU 10b; the rotation position and/or the rotation speed of the electric motor are/is calculated and then are/is utilized in the feedback control of the second inverter circuit 3b and the like.

Because the respective currents that flow in the first driving circuit 11a and the second driving circuit 11b are small, the first driving circuit 11a and the second driving circuit 11b are disposed in the first control circuit unit 4a and the second control circuit unit 4b, respectively, in Embodiment 1; however, it is made possible that the first driving circuit 11a is disposed in the first inverter circuit 3a and the second driving circuit 11b is disposed in the second inverter circuit 3b. It may be allowed that because a large current flows and hence heat is generated in each of them, the first power-source-relay switching device 5a and the second power-source-relay switching device 5b are included in the first inverter circuit 3a and the second inverter circuit 3b, respectively.

As described above, each of the first control unit 1a and the second control unit 1b independently utilizes input information and the calculation value for a control amount and is capable of independently driving the electric motor 2. A communication line 14 is connected between the first control unit 1a and the second control unit 1b so that data and information can be transmitted and received therebetween. The communication line 14 connects the first CPU 10a with the second CPU 10b, so that the first CPU 10a can comprehend the condition of the second CPU 10b, and vice versa.

For example, when the first CPU 10a detects that a failure has occurred in the first inverter circuit 3a or in the first armature winding 201 and turns off the first power-source-relay switching device 5a and/or the motor switching devices 34U, 34V, and 34W, information pieces on the contents of the abnormality detection, the subject component, the motor driving condition, and the like are transferred to the second CPU 10b. Similarly, when the second CPU 10b detects that a failure has occurred in the second inverter circuit 3b or in the second armature winding 202 and turns off the second power-source-relay switching device 5b and/or the motor switching devices 341U, 341V, and 341W, information pieces on the contents of the abnormality detection, the subject component, the motor driving condition, and the like are transferred to the first CPU 10a.

It is only necessary that the first control circuit unit 4a, the second control circuit unit 4b, and the respective components mounted therein can functionally drive the first armature winding 201 and the second armature winding 202 of the electric motor 2; thus, it may be allowed that instead of the two independent groups, a single configuration is utilized; for example, it may be allowed that only a single CPU or only a single power-supply circuit is provided.

Figure 2:
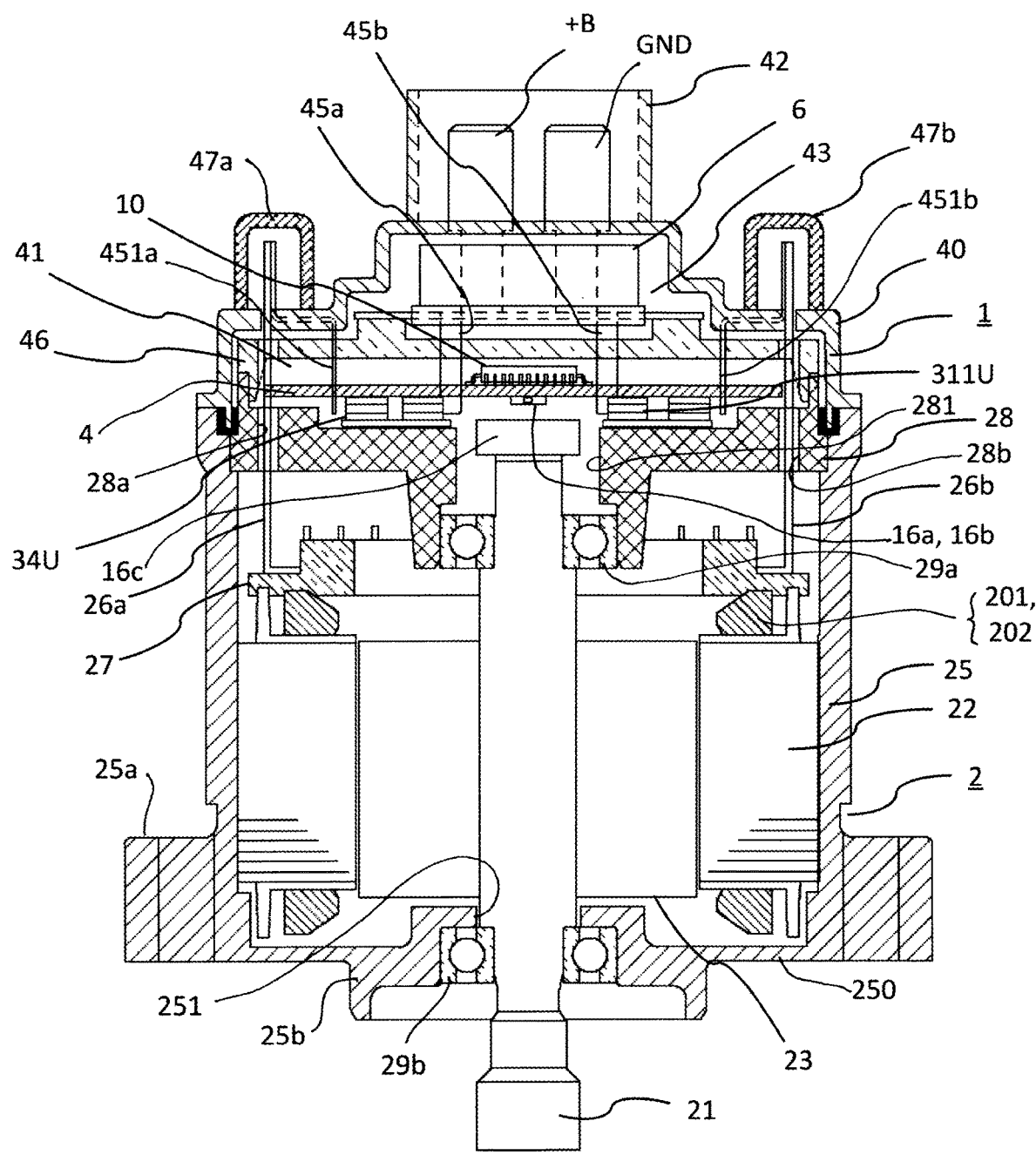
FIG. 2 is a cross-sectional view of the electric power steering apparatus according to Embodiment 1 of the present invention.
Figure 3:
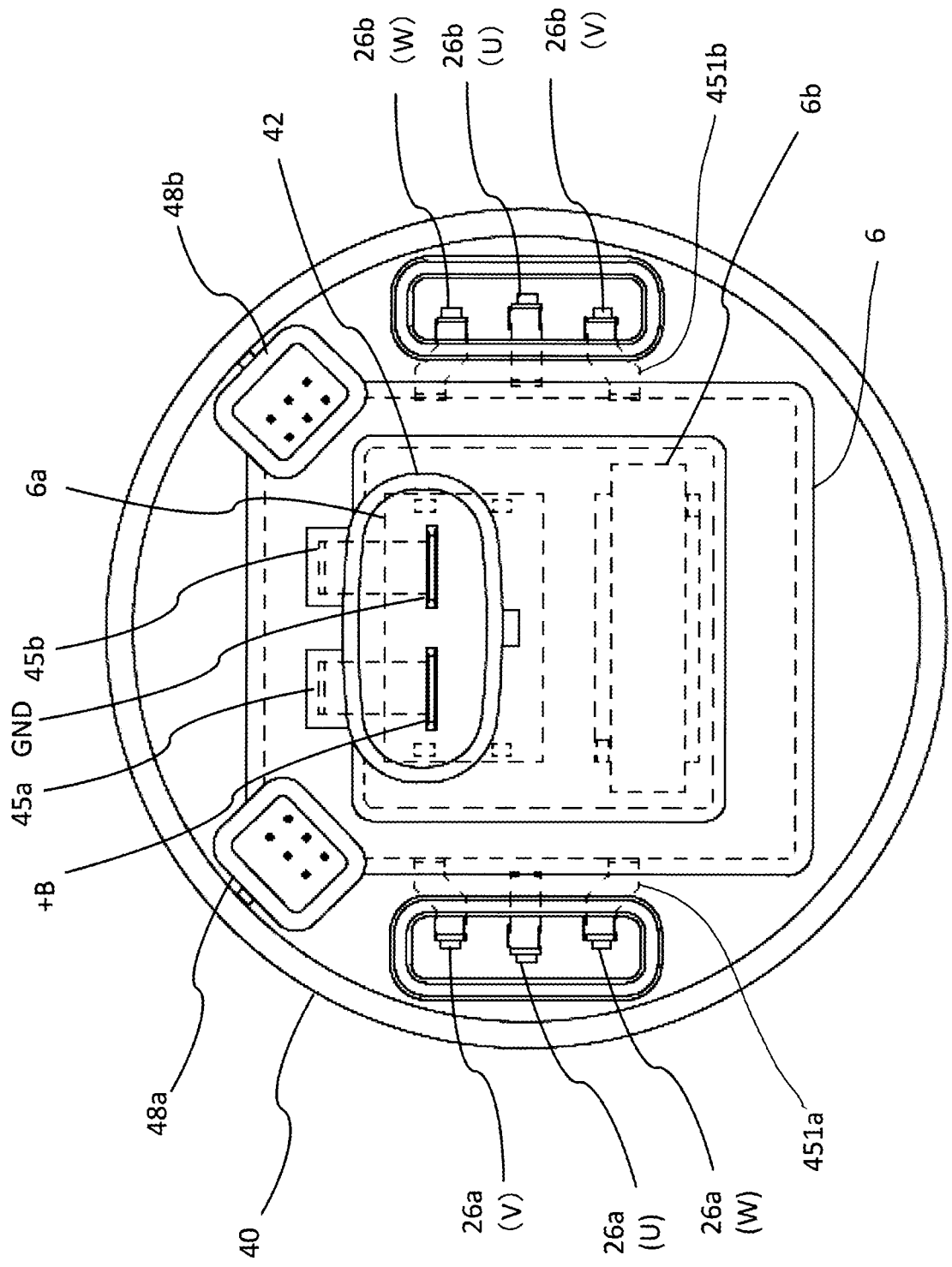
FIG. 3 is an explanatory view of a controller in the electric power steering apparatus according to Embodiment 1 of the present invention.

Next, there will be explained the integrated configuration in which the electric motor 2, the first control unit 1a, and the second control unit 1b of the electric power steering apparatus, according to Embodiment 1 of the present invention, that has a foregoing circuit configuration. FIG. 2 is a cross-sectional view of the electric power steering apparatus according to Embodiment 1 of the present invention; FIG. 3 is a plan view of the control unit in the electric power steering apparatus according to Embodiment 1 of the present invention. In FIG. 2, the electric motor 2 is situated at the lower part of the drawing; a control unit 1 including the first control unit 1a and the second control unit 1b is situated at the upper part of the drawing. The electric motor 2 and the control unit 1 are integrated with each other in such a way as to be arranged coaxially on the axis line of an output axle 21 of the electric motor 2.

An electric-motor case 25 that is made of metal and formed in the shape of a cylindrical tube has an end wall portion 250 in which a mounting flange portion 25a for mounting the electric power steering apparatus in a mechanism portion or the like of a vehicle and a connection portion 25b for mechanically connecting the electric power steering apparatus with a speed reducer (unillustrated) are integrally formed. The electric-motor case 25 is preferably formed of, for example, aluminum, when the heat radiation performance and the outer shape thereof are taken into consideration. A stator 22 and a rotor 23 of the electric motor 2 are contained in the electric-motor case 25. The output-side end portion in the axis direction of the output axle 21 of the electric motor 2 is pivotably supported by a first bearing 29b mounted in an end wall portion through-hole 251 provided in the radial-direction middle portion of the end wall portion 250, penetrates the end wall portion through-hole 251, and protrudes toward the speed reducer.

The rotor 23 is fixed to the output axle 21; in the circumferential direction thereof, two or more pairs of magnetic-field poles, each of which is formed of a permanent magnet, are arranged. The circumferential surface of the rotor 23 is disposed in such a way as to face the inner circumferential surface of the stator 22 via a gap. The first armature winding 201 and the second armature winding 202 are mounted on the stator 22. The three first winding terminals 26a of the windings of the respective phases in the first armature winding 201 are electrically connected with respective connecting conductors of the connection ring 27 disposed in the right vicinity of the armature winding and extend in the axle direction of the electric motor 2 from the axle-direction endface of the connection ring 27 to the control unit 1. Similarly, the three second winding terminals 26b of the windings of the respective phases in the second armature winding 202 are electrically connected with respective connecting conductors of the connection ring 27 and extend in the axle direction of the electric motor 2 from the axle-direction endface of the connection ring 27 to the control unit 1, at positions opposite to the first winding terminals 26a via the output axle 21.

A frame 28 is mounted in such a way as to be inscribed to the end portion, at the anti-speed-reducer side in the axle direction, of the electric-motor case 25. The frame 28 is also made of metal; a second bearing 29a is mounted in a frame through-hole 281 formed in the radial-direction middle portion. The end portion, at the anti-output side, of the output axle 21 of the electric motor 2 is pivotably supported by the second bearing 29a. The rotation sensor rotor 16c, described above, is fixed on the end portion at the anti-output side, of the output axle 21 of the electric motor 2. The frame 28 is provided with a first winding-terminal through-hole 28a through which the first winding terminal 26a passes and a second winding-terminal through-hole 28b through which the second winding terminal 26b passes. The first winding terminal 26a, described above, penetrates the first winding-terminal through-hole 28a and then extends toward a control board 4 in the axle direction of the electric motor 2. The second winding terminal 26b, described above, penetrates the second winding-terminal through-hole 28b and then extends toward the control board 4 in the axle direction of the electric motor 2.

The frame 28 has two or more functions such as a function as a diaphragm for separating the electric motor 2 from the control unit 1 and a function of holding the second bearing 29a. Furthermore, the frame 28 also has a function as a heat sink for radiating the heat of the control unit 1. As described above, because the frame 28 has a great number of functions, the number of components can be reduced.

As described above, the electric motor 2 has a structure in which the electric-motor case 25 contains the output axle 21, the rotor 23, the stator 22, the first armature winding 201, the second armature winding 202, the connection ring 27, the frame 28, the first bearing 29b, and the second bearing 29a. Accordingly, the electric motor 2 can be assembled separately from the control unit 1. The electric motor 2 and the control unit 1 are assembled separately from each other and then are integrated with each other.

Next, the control unit 1 will be explained. The control unit 1 includes the first control unit 1a and the second control unit 1b represented in FIG. 1 and is covered with a housing 40 fixed to the axle-direction end portion of the metal electric-motor case 25. An inner housing 46, described later, separates the inside of the housing 40 into a first room 41 and a second room 43. The first room 41 contains the control board 4 on which the control circuit unit including the first control circuit unit 4a and the second control circuit unit 4b is mounted. The CPU 10 including the first CPU 10a and the second CPU 10b is mounted on the surface, at the anti-electric-motor 2 side, of the control board 4. Both the first CPU 10a and the second CPU 10b, represented in FIG. 1, of the CPU 10 are contained in a single package.

The switching devices of the respective phases, such as the U-phase upper arm switching device 31U and the U-phase lower arm switching device 32U, in the first inverter circuit 3a and the switching devices of the respective phases, such as the U-phase upper arm switching device 311U and the U-phase lower arm switching device 321U, in the second inverter circuit 3b are mounted on the surface, at the electric motor 2 side, of the control board 4 (in FIG. 2, only the reference character 311U is represented). The first motor switching devices 34U, 34V, and 34W of the respective phases in the first inverter circuit 3a and the second motor switching devices 341U, 341V, and 341W of the respective phases in the second inverter circuit 3b are mounted on the surface, at the electric motor 2 side, of the control board 4 (in FIG. 2, only the reference character 34U is represented).

The first winding terminal 26a, described above, penetrates the first winding-terminal through-hole 28a, passes through the peripheral portion of the control board 4, and further penetrates a penetration opening in the housing 40 so as to extend to the outside of the housing 40. The first winding terminal 26a extends in the axle direction of the electric motor 2. The second winding terminals 26b penetrates the second winding-terminal through-hole 28b, passes through the peripheral portion of the control board 4, and further penetrates a penetration opening in the housing 40 so as to extend to the outside of the housing 40. The second winding terminal 26b extends in the axle direction of the electric motor 2."

The inner housing 46, described above, is disposed inside the housing 40 and is fixed to the axle-direction end portion of the frame 28. The inner housing 46 is made of, for example, an insulative resin; the filter unit 6 represented in FIG. 1 is mounted thereon. The inner housing 46 has a role of fixing first electric conductors 451a from the switching devices of the respective phases, such as the U-phase upper arm switching device 31U and the U-phase lower arm switching device 32U, in the first inverter circuit 3a, the first motor switching devices 34U, 34V, and 34W, and the like and second electric conductors 451b from the switching devices of the respective phases, such as the U-phase upper arm switching device 311U and the U-phase lower arm switching device 321U, in the second inverter circuit 3b, the second motor switching devices 341U, 341V, and 341W, and the like. Furthermore, the inner housing 46 has a role of fixing bus bars 45a and 45b connected with the filter unit 6. When covered with a metal plate, the inner housing 46 can be utilized as a shielding wall for separating the control board 4 from the filter unit 6.

The filter unit 6, described above, is contained in the second room 43 of the housing 40. As illustrated in FIG. 2, the housing 40 is formed in such a way that the portion that corresponds to the second room 43 protrudes toward the anti-electric-motor 2 side. A power-source connector 42 provided with the +B terminal and the GND terminal is disposed in the portion, of the housing 40, that corresponds to the second room 43. The power-source connector 42 and the housing 40 are integrated with each other and are made of resin.

The switching control of the power switching devices, such as the switching devices 311U and 34U, mounted on the surface, at the electric motor 2 side, of the control board 4 causes heat generation. Accordingly, those power switching devices are arranged in such a way that the surfaces thereof abut on the surface of the frame 28 so that the heat can be transferred to the frame 28. In other words, the frame 28 has a role also as a heat sink.

As described above, each of the first winding terminal 26a and the second winding terminals 26b passes through the peripheral portion of the control board 4 and penetrates the housing 40 so as to extend to the outside of the housing 40. The first electric conductor 451a and the second electric conductor 451b from the switching devices, such as the switching devices 311U and 34U, on the control board 4 also penetrate the housing 40 so as to extend to the outside of the housing 40 and are electrically connected with the front-end portions of the winding terminals 26a and 26b, respectively, for example, through welding. These respective connection portions are covered with covers 47a and 47b. Because, as described above, the connection portion between the first winding terminal 26a and the first electric conductor 451a and the connection portion between the second winding terminals 26b and the second electric conductor 451b are arranged outside the housing 40, the workability of connecting these members is raised. For example, it is not required to consider spatters caused by the welding and the arrangement of welding tools; thus, the working efficiency is remarkably raised in comparison with the case where the welding is performed inside the control unit 1.

FIG. 3 is an explanatory view of the control unit in the electric power steering apparatus according to Embodiment 1 of the present invention. The electric conductors extending from the +B terminal and the GND terminal in the power-source connector 42 to the control board 4 via the filter unit 6 are the portions that are directly connected therebetween, as illustrated in the circuit in FIG. 1; thus, because the current that flows in each of the electric conductors is large, the width and the thickness thereof need to correspond to the current and hence downsizing is hindered. Therefore, the power-source connector 42 is disposed at the substantially middle portion of the housing 40, as illustrated in FIG. 3. The power-source connector 42 has the +B terminal and the GND terminal; these respective terminals extend in the housing 40 and are connected with the bus bar 45a and 45b, respectively.

The respective components in the filter unit 6 in FIG. 1 are connected with the bus bars 45a and 45b. For example, under the power-source connector 42, a common mode coil 6a and a normal mode coil 6b are arranged in that order and are connected with the bus bars 45a and 45b, respectively. As described above, the power-source connector 42 and the components in the filter unit 6, which is a large component, are sterically arranged and hence the mounting area is reduced, so that the downsizing is implemented.

In addition, a first signal connector 48a and a second signal connector 48b for the sensors 8 are arranged from side to side in the housing 40 in such a way as to be separated from each other. The first signal connector 48a is connected with the first input circuit 12a of the first control circuit unit 4a; the second signal connector 48b is connected with the second input circuit 12b of the second control circuit unit 4b. The first winding terminal 26a and the second winding terminals 26b are arranged substantially symmetrically in the peripheral portion of the housing 40 in such a way as to flank the filter unit 6 and are connected with the first electric conductor 451a and the second electric conductor 451b, respectively. The connection position between the first winding terminal 26a and the first electric conductor 451a and the connection position between the second winding terminals 26b and the second electric conductor 451b are arranged substantially symmetrically with respect to the middle portion of the housing 40.

As described above, the first signal connector 48a and the second signal connector 48b are arranged in the vicinity of the housing 40, and the connection portion between the first winding terminal 26a and the first electric conductor 451a and the connection portion between the second winding terminals 26b and the second electric conductor 451b are arranged in the vicinity of the housing 40; therefore, because the conductive wires extending from these members are arranged in the peripheral portion or in the vicinity of the control board 4, the effective area of the control board 4 is not reduced.

As described above, the electric power steering apparatus according to Embodiment 1 of the present invention has a two-storied structure in which the control unit 1 is mounted on the axle-direction end portion, at the anti-electric-motor side, of the output axle 21 of the electric motor 2 so as to be integrated with the electric motor 2, in which the power-source connector is disposed at the substantially middle portion of the housing of the control unit 1, and in which the filter unit 6 is disposed under the power-source connector, and the winding terminals and the signal connectors are arranged in the peripheral portion of the housing 40; thus, the respective components can be arranged within a diameter the same as that of the motor 2 and hence the downsizing can be implemented. This arrangement makes it possible that the wiring leads that start from the power-source terminal and then pass through the filter unit 6 can be shortened as much as possible. Furthermore, because the respective connection positions between the winding terminals 26a and 26b and the switching devices are situated in the peripheral side of the housing, the working efficiency can be raised.

Embodiment 2

Figure 4:
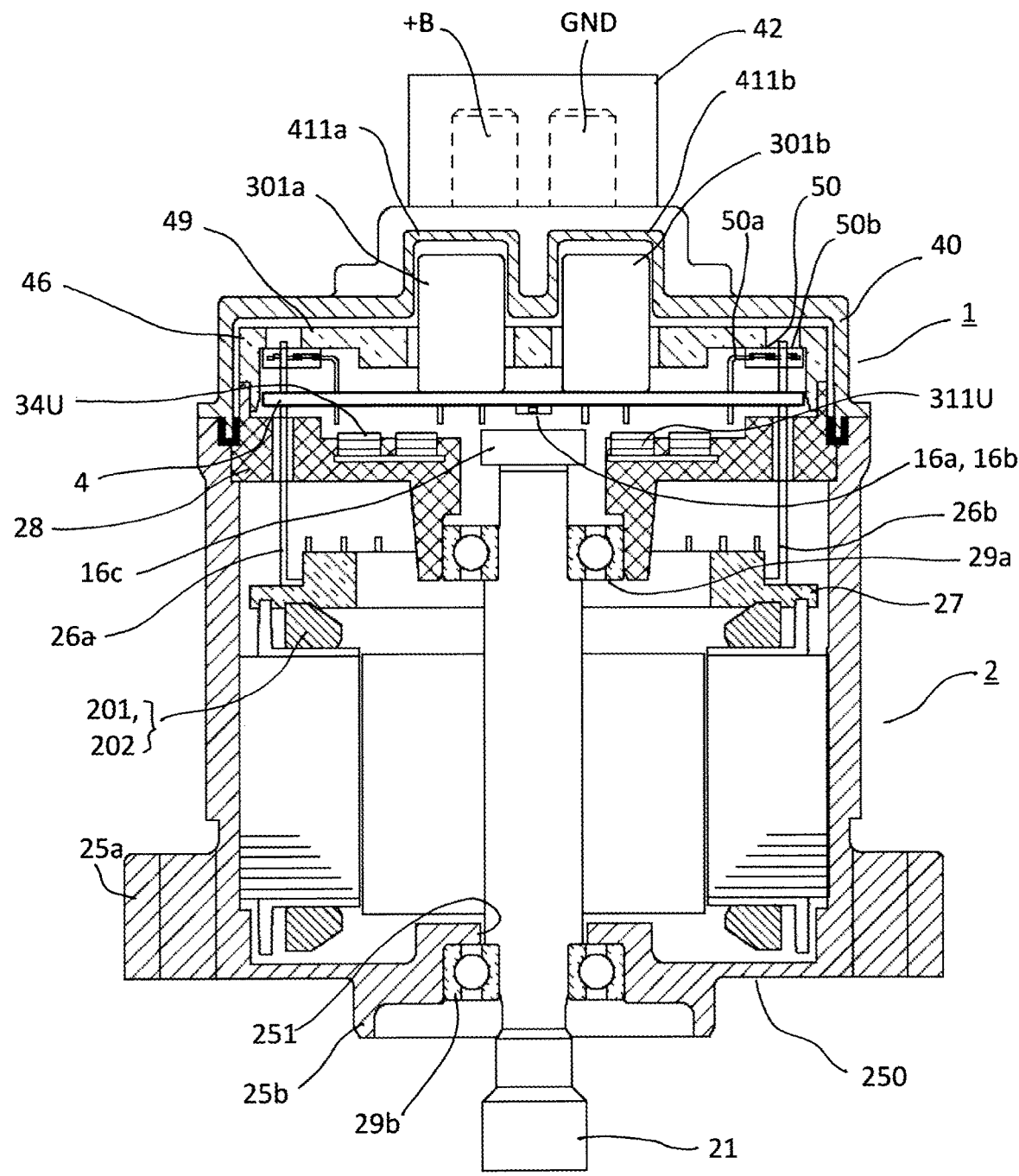
FIG. 4 is a cross-sectional view of the electric power steering apparatus according to Embodiment 2 of the present invention.
Figure 5:
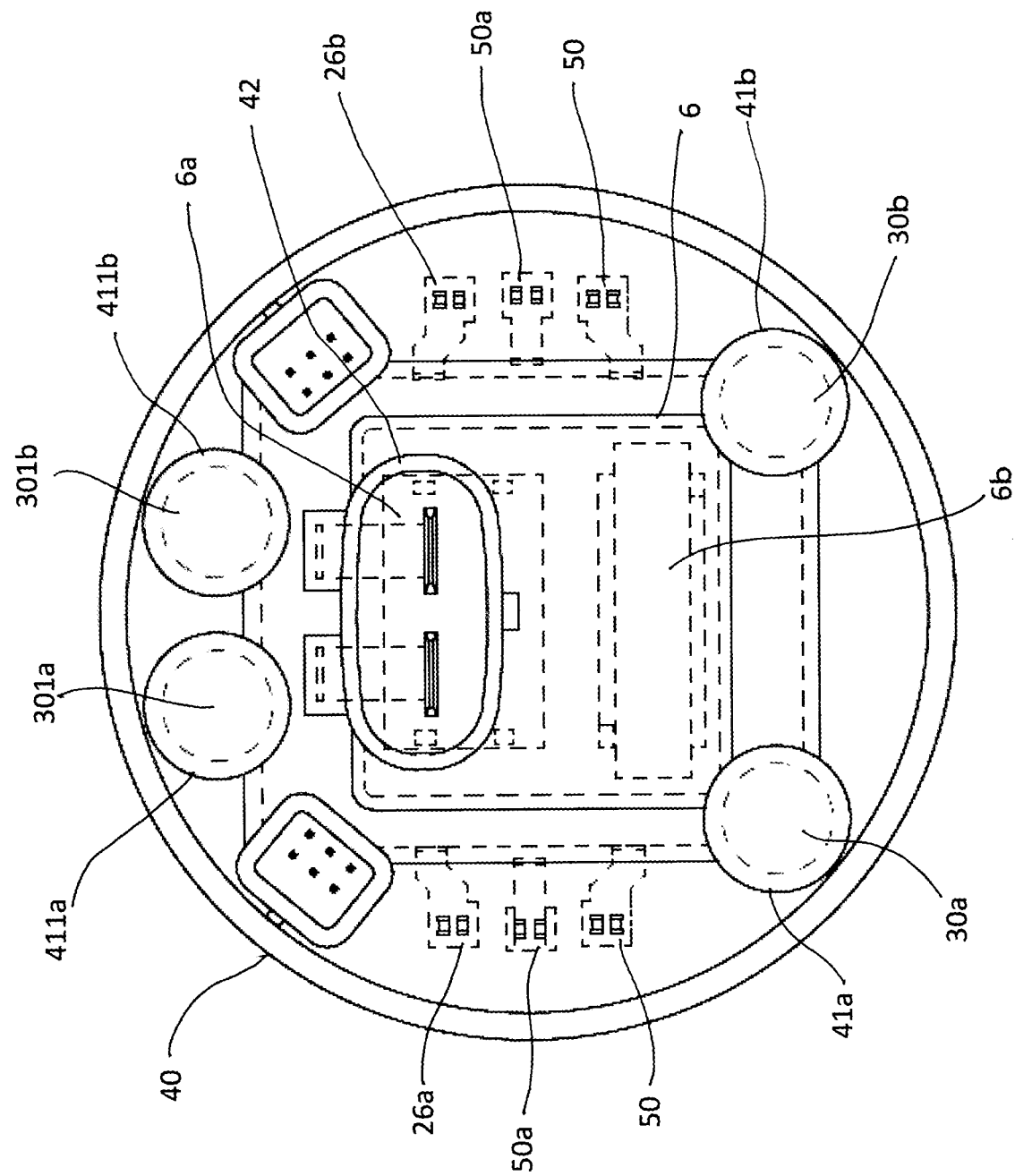
FIG. 5 is an explanatory view of a controller in the electric power steering apparatus according to Embodiment 2 of the present invention."

Next, an electric power steering apparatus according to Embodiment 2 of the present invention will be explained. FIG. 4 is a cross-sectional view of the electric power steering apparatus according to Embodiment 2 of the present invention; FIG. 5 is an explanatory view of a control unit in the electric power steering apparatus according to Embodiment 2 of the present invention; in FIGS. 4 and 5, the elements the same as or equivalent to those in FIGS. 1, 2, and 3 are designated by the same reference characters.

The different points between Embodiment 1 and Embodiment 2 are the connection structures of the first winding terminal 26a and the second winding terminals 26b of the electric motor 2 and the arrangement of the first capacitor 30a, the second capacitor 30b, the third capacitor 301a, and the fourth capacitor 301b in the control unit 1.

In FIGS. 4 and 5, the control unit 1 is disposed at the axle-direction anti-output side of the electric motor 2 in such a way as to be coaxial with the output axle 21 of the electric motor 2. The three first winding terminals 26a of the windings of the respective phases in the first armature winding 201 are electrically connected with respective connecting conductors of the connection ring 27 disposed in the right vicinity of the armature winding and extend in the axle direction of the electric motor 2 from the axle-direction endface of the connection ring 27 to the control unit 1; however, the front-end portions thereof do not penetrate the housing 40 but stay within the housing 40.

Similarly, the three second winding terminals 26b of the windings of the respective phases in the second armature winding 202 are electrically connected with respective connecting conductors of the connection ring 27 and extend in the axle direction of the electric motor 2 from the axle-direction endface of the connection ring 27 to the control unit 1, at positions opposite to the first winding terminals 26a via the output axle 21; however, the front-end portions thereof do not penetrate the housing 40 but stay within the housing 40.

Meanwhile, a terminal 50 is provided on the control board 4. The terminal 50 includes a conductive plate 50a and an insulative resin portion 50b. Via the strip conductor of the control board 4, one end of the conductive plate 50a is connected with the switching devices 31U, 31V, and 31W of the respective arms of the first inverter circuit 3a or the switching devices 311U, 311V, and 311W of the respective arms of the second inverter circuit 3b (in FIG. 4, only the reference character 311U is expressed) and the first motor switching devices 34U, 34V, 34W of the respective phases of the first inverter circuit 3a or the second motor switching devices 341U, 341V, 341W of the respective phases of the second inverter circuit 3b (in FIG. 4, only the reference character 34U is expressed).

The other end of the conductive plate 50a is covered with the insulative resin portion 50b; window portions are provided in the insulative resin portion 50b, and the conductive plates 50a are disposed in the window portions in such a way as to be separated into at least two pieces each in a fork-shaped manner. FIG. 5 illustrates that two pieces each of the fork-shaped conductive plates 50a are arranged. Each of the first winding terminal 26a and the second winding terminals 26b is inserted between the portions of the conductive plate 50a, which are separated in a fork-shaped manner, fitted with the conductive plate 50a, and electrically connected with the conductive plate 50a through press-fitting. Part of the insulative resin portion 50b abuts on the inner housing 46; through the abutting, there are performed positioning of the terminal 50 and supporting of the pressure at a time when each of the first winding terminal 26a and the second winding terminals 26b is inserted into the conductive plate 50a.

The first capacitor 30a and the second capacitor 30b for suppressing noise from the switching devices of the first inverter circuit 3a represented in FIG. 1 and the third capacitor 301a and the fourth capacitor 301b for suppressing noise from the switching devices of the second inverter circuit 3b represented in FIG. 1 are connected with the control board 4. These capacitors 30a, 30b, 301a, and 301b are mounted on the control board 4; because being relatively large components, these capacitors 30a, 30b, 301a, and 301b penetrate penetration openings provided in the inner housing 46 and extend in such away as to go beyond the endface of the housing 40, as illustrated in FIG. 4.

As illustrated in FIG. 5, these capacitors 30a, 30b, 301a, and 301b are arranged in the surroundings of the filter unit 6, described also in Embodiment 1. The housing 40 has tubular protrusions 41a, 411a, 41b, and 411b at the respective positions corresponding to these capacitors 30a, 30b, 301a, and 301b; the capacitors 30a, 30b, 301a, and 301b are partially contained in the tubular protrusions 41a, 411a, 41b, and 411b, respectively.

Because the filter unit 6 and the power-source connector 42 are arranged in the middle portion of the housing 40, the protrusions 41a, 411a, 41b, and 411b for the capacitors can sterically be arranged without overlapping with the filter unit 6 and the power-source connector 42.

As illustrated in FIG. 5, the capacitors 30a, 30b, 301a, and 301b are arranged at respective positions that are substantially symmetric with one another. This is because each of the first inverter circuit 3a and the second inverter circuit 3b has the same circuit configuration and the constituent components of each of the first inverter circuit 3a and the second inverter circuit 3b are arranged in the same manner; as a result, the capacitors 30a, 30b, 301a, and 301b can be arranged in such a way as to be symmetric with the respective corresponding capacitors. This symmetric arrangement suppresses as much as possible the electrical difference between the first inverter circuit 3a and the second inverter circuit 3b, for example, the difference in the circuitry impedance.

As described above, in the electric power steering apparatus according to Embodiment 2 of the present invention, the connection between the winding terminals and the control circuit units is performed within the control unit 1; therefore, the assembly can be simplified. Moreover, it is made possible that the capacitors having a large height can be contained in the protrusions provided in the housing 40 and hence it is made possible that without enlarging the diameter of the electric motor 2, all portions can be arranged within the diameter of the electric motor 2; therefore, the downsizing can be achieved.

The present invention is not limited to the respective electric power steering apparatuses according to foregoing Embodiments 1 and 2; in the scope within the spirits of the present invention, the respective configurations of Embodiments 1 and 2 can appropriately be combined with each other, can partially be modified, or can partially be omitted.

DESCRIPTION OF REFERENCE NUMERALS

1: control unit
1a: first control unit
1b: second control unit
2: electric motor
3a: first inverter circuit
3b: second inverter circuit
4: control board
4a: first control circuit unit
4b: second control circuit unit
5a: first power-source relay
5b: second power-source relay
6: filter unit
8: sensors
10a: first CPU
10b: second CPU
11a: first driving circuit
11b: second driving circuit
12a: first input circuit
12b: second input circuit
13a: first power-supply circuit
13b: second power-supply circuit
16a: first rotation sensor
16b: second rotation sensor
30a: first capacitor
30b: second capacitor
31U, 32U, 311U, 321U, 34U, 34V, 34W, 341U, 341V, and 341W: switching
devices
40: housing
42: power-source connector
46: inner housing
50: terminal

The invention claimed is:

1. An electric power steering apparatus comprising:
an electric motor that has two groups of armature windings having the same configuration and generates assist torque corresponding to steering torque produced by a vehicle driver;
a controller that has two groups of control circuits capable of separately controlling the two groups of armature windings and that is disposed on the axle-direction end portion, at the anti-output side, of the electric motor so as to be integrally fixed to the electric motor; and
a housing that is fixed to the electric motor and covers the controller,
wherein the controller includes:
a power-source connector that connects the controller with an external power source,
a first connection portion where the winding terminal of the armature winding of one of the two groups of armature windings is connected with one of the two groups of control circuits, and
a second connection portion where the winding terminal of the armature winding of the other one of the two groups of armature windings is connected with the other one of the two groups of control circuits,
wherein the power-source connector is situated at or in the vicinity of the radial-direction middle portion of the housing and is fixed to the housing,
wherein the first connection portion and the second connection portion are substantially symmetrically arranged at positions corresponding to the radial-direction peripheral portions of the power-source connector,
wherein the controller has two or more capacitors for suppressing noise,
wherein in the housing, the two or more capacitors are arranged in such a way as to be substantially symmetric with each other in the circumferential direction of the housing, and
wherein the housing has protrusions for containing parts, of the two or more capacitors, that each include at least the top portion of the capacitor.

2. The electric power steering apparatus according to claim 1,
wherein the controller has a filter connected with the power-source connector, and
wherein in the controller, the filter is disposed at a position, in the radial direction, that at least partially overlaps with the position, in the radial direction, of the power-source connector.

3. The electric power steering apparatus according to claim 2,
wherein the controller has a control board provided with the two groups of control circuits,
wherein the power-source connector is disposed in such a way as to protrude in the axle direction from the end face, at the anti-output side, of the housing, and
wherein the filter and the control board are arranged in the housing in such a way as to be parallel with each other in the axle direction.

4. The electric power steering apparatus according to claim 3, further including signal connectors connected with the two groups of control circuits, wherein the signal connectors are arranged in the peripheral portion, in the radial direction, of the housing.

5. The electric power steering apparatus according to claim 2, further including signal connectors connected with the two groups of control circuits, wherein the signal connectors are arranged in the peripheral portion, in the radial direction, of the housing.

6. The electric power steering apparatus according to claim 2, wherein the first connection portion and the second connection portion are arranged in such a way as to protrude in the axle direction from the axle-direction end portion of the housing.

7. The electric power steering apparatus according to claim 2, wherein the first connection portion and the second connection portion are arranged inside the housing.

8. The electric power steering apparatus according to claim 2, wherein two or more electric conductors for connecting the two groups of control circuits with the power-source connector are formed in the substantially same shape and are arranged in such a way as to be substantially symmetric with each other with respect to the radial-direction central portion of the housing.

9. The electric power steering apparatus according to claim 3, wherein the first connection portion and the second connection portion are arranged in such a way as to protrude in the axle direction from the axle-direction end portion of the housing.

10. The electric power steering apparatus according to claim 3, wherein the first connection portion and the second connection portion are arranged inside the housing.

11. The electric power steering apparatus according to claim 3, wherein two or more electric conductors for connecting the two groups of control circuits with the power-source connector are formed in the substantially same shape and are arranged in such a way as to be substantially symmetric with each other with respect to the radial-direction central portion of the housing.

12. The electric power steering apparatus according to claim 1, further including signal connectors connected with the two groups of control circuits, wherein the signal connectors are arranged in the peripheral portion, in the radial direction, of the housing.

13. The electric power steering apparatus according to claim 1, wherein the first connection portion and the second connection portion are arranged inside the housing.

14. The electric power steering apparatus according to claim 1, wherein two or more electric conductors for connecting the two groups of control circuits with the power-source connector are formed in the substantially same shape and are arranged in such a way as to be substantially symmetric with each other with respect to the radial-direction central portion of the housing.

15. An electric power steering apparatus comprising:
an electric motor that has two groups of armature windings having the same configuration and generates assist torque corresponding to steering torque produced by a vehicle driver:
a controller that has two groups of control circuits capable of separately controlling the two groups of armature windings and that is disposed on the axle-direction end portion, at the anti-output side, of the electric motor so as to be integrally fixed to the electric motor; and
a housing that is fixed to the electric motor and covers the controller,
wherein the controller includes:
   a power-source connector that connects the controller with an external power source
   a first connection portion where the winding terminal of the armature winding of one of the two groups of armature windings is connected with one of the two groups of control circuits, and
   a second connection portion where the winding terminal of the armature winding of the other one of the two groups of armature windings is connected with the other one of the two groups of control circuits,
wherein the power-source connector is situated at or in the vicinity of the radial-direction middle portion of the housing and is fixed to the housing,
wherein the first connection portion and the second connection portion are substantially symmetrically arranged at positions corresponding to the radial-direction peripheral portions of the power-source connector, and
wherein the first connection portion and the second connection portion are arranged in such a way as to protrude in the axle direction from the axle-direction end portion of the housing.

16. An electric power steering apparatus comprising:
an electric motor that has two groups of armature windings having the same configuration and generates assist torque corresponding to steering torque produced by a vehicle driver:
a controller that has two groups of control circuits capable of separately controlling the two groups of armature windings and that is disposed on the axle-direction end portion, at the anti-output side, of the electric motor so as to be integrally fixed to the electric motor; and
a housing that is fixed to the electric motor and covers the controller,
wherein the controller includes:
   a power-source connector that connects the controller with an external power source
   a first connection portion where the winding terminal of the armature winding of one of the two groups of armature windings is connected with one of the two groups of control circuits, and
   a second connection portion where the winding terminal of the armature winding of the other one of the two groups of armature windings is connected with the other one of the two groups of control circuits,
wherein the power-source connector is situated at or in the vicinity of the radial-direction middle portion of the housing and is fixed to the housing,
wherein the first connection portion and the second connection portion are substantially symmetrically arranged at positions corresponding to the radial-direction peripheral portions of the power-source connector,
wherein the controller has a filter connected with the power-source connector, and
wherein in the controller, the filter is disposed at a position, in the radial direction, that at least partially overlaps with the position, in the radial direction, of the power-source connector,
wherein the controller has an inner housing provided inside the housing,
wherein the inner housing is disposed in such a way as to separate the inside of the housing into two rooms in the axle direction, and
wherein the filter is disposed in one of the two rooms, which is situated at the housing side, and at least the control circuit of the controller is disposed in the other one of the two rooms.

* * * * *